United States Patent
Su et al.

(10) Patent No.: US 9,967,741 B2
(45) Date of Patent: May 8, 2018

(54) METHOD OF FACILITATING SET UP OF NETWORK CONNECTION, A COMPUTER PROGRAM PRODUCT, AND AN ELECTRONIC DEVICE

(71) Applicants: ThroughTek Technology (ShenZhen) Co., Ltd., Shenzhen (CN); ThroughTek Co., Ltd., Taipei (TW)

(72) Inventors: Wei-Yi Su, Taipei (TW); Yu-Lin Hsieh, Taipei (TW)

(73) Assignees: THROUGHTEK TECHNOLOGY (SHENZHEN) CO., LTD., Shenzhen (CN); THROUGHTEK CO., LTD., Taipei (TW)

( * ) Notice: Subject to any disclaimer, the term of this patent is extended or adjusted under 35 U.S.C. 154(b) by 92 days.

(21) Appl. No.: 14/634,198

(22) Filed: Feb. 27, 2015

(65) Prior Publication Data
US 2016/0057791 A1 Feb. 25, 2016

(30) Foreign Application Priority Data
Aug. 22, 2014 (TW) .............................. 103129041 A (51) Int. Cl.
*H04W 4/00* (2018.01)
*H04W 12/06* (2009.01)
(Continued)

(52) U.S. Cl.
CPC ............ *H04W 12/06* (2013.01); *H04W 48/16* (2013.01); *H04W 84/12* (2013.01)

(58) Field of Classification Search
None
See application file for complete search history.

(56) References Cited

U.S. PATENT DOCUMENTS 8,539,567 B1 * 9/2013 Logue ................. H04L 63/0884
709/223
2008/0250122 A1 * 10/2008 Zsigmond ............... H04L 67/34
709/220
(Continued)

FOREIGN PATENT DOCUMENTS

CN 102395216 A 3/2012
WO 2014/005939 A1 1/2014

OTHER PUBLICATIONS

Search Report issued in counterpart Taiwanese Application No. 103129041, dated Dec. 8, 2015, and corresponding English translation.

*Primary Examiner* — Rebecca E Song
(74) *Attorney, Agent, or Firm* — Hamre, Schumann, Mueller & Larson, P.C.

(57) ABSTRACT

A method of facilitating set up of network connection of an electronic device to an external network is to be implemented by a portable communication device, and includes the steps of obtaining connection information which is associated with network connection with the electronic device, establishing wireless network connection with the electronic device according to the connection information, and transmitting an identifier and a password which are associated with a wireless AP to the electronic device so as to enable the electronic device to connect to the wireless AP using the identifier and the password so that the electronic device gains access to the external network via the wireless AP.

5 Claims, 5 Drawing Sheets

(51) Int. Cl.
　　　*H04W 84/12*　　　(2009.01)
　　　*H04W 48/16*　　　(2009.01)

(56)　　　　　References Cited

U.S. PATENT DOCUMENTS

| | | |
|---|---|---|
| 2010/0073147 A1* | 3/2010 | Guajardo Merchan .......... G06K 19/07309 340/10.51 |
| 2011/0122835 A1* | 5/2011 | Naito .................. H04W 76/023 370/329 |
| 2011/0289229 A1* | 11/2011 | Subramaniam ..... H04L 41/0806 709/228 |
| 2014/0082610 A1* | 3/2014 | Wang ...................... G06F 9/445 717/178 |
| 2014/0321446 A1* | 10/2014 | Son ....................... H04W 48/08 370/338 |
| 2015/0029540 A1* | 1/2015 | Jo ......................... G06F 3/1209 358/1.15 |
| 2016/0020804 A1* | 1/2016 | Lee ...................... H04B 1/3816 455/558 |
| 2016/0043962 A1* | 2/2016 | Kim ........................ H04L 47/70 709/224 |
| 2016/0050566 A1* | 2/2016 | Li .......................... H04W 4/008 726/6 |

* cited by examiner

METHOD OF FACILITATING SET UP OF NETWORK CONNECTION, A COMPUTER PROGRAM PRODUCT, AND AN ELECTRONIC DEVICE

CROSS-REFERENCE TO RELATED APPLICATION

This application claims priority of Taiwanese Patent Application No. 103125041, filed on Aug. 22, 2014.

FIELD OF THE INVENTION

The invention relates to a method of facilitating set up of network connection, a computer program product, and an electronic device, more particularly to a method of facilitating set up of network connection of an electronic device, which is to be applied on the Internet of Things, to an external network, a computer program product associated with the method, and an electronic device to be connected to an external network.

BACKGROUND OF THE INVENTION

The Internet of Things (IoT) is related to connection of objects to the Internet through wired or wireless communication technology, so as to provide smart information management and sharing. The IoT architecture consists of three layers. Specifically, the bottom layer is a sensing layer which realizes, by means of various electronic elements provided with sensing functions, acquisition of different kinds of information for subsequent application. The top layer is an application layer which includes application platforms in different domains, such as environmental monitoring, smart medical care, and cloud computing platforms. The intermediate layer is a network layer which is responsible for transmission of data between the sensing layer and the application layer via various kinds of wired/wireless communication media.

In practice, after purchasing an electronic device compatible with the IoT, such as a wireless internet camera, how to connect the wireless internet camera to an external network (e.g., the Internet) is always troublesome for common users. Therefore, the complexity of network settings for connecting IoT-compatible electronic devices to the external network may hinder popularization of these devices.

SUMMARY OF THE INVENTION

Therefore, an object of the present invention is to provide a time-saving method related to set op of a network connection, a computer program product and an electronic device.

According to a first aspect of the present invention, a method of facilitating set op of network connection of an electronic device to an external network is to foe applied in a system. The system includes a wireless access point (AP) which has been connected to the external network, the electronic device, connection of which to the external network is desirable, and a portable communication device which is in possession of a first identifier and a first password associated with the wireless AP and which is wirelessly communicable with the wireless AP and the electronic device. The method is to be implemented by the portable communication device, and includes the following steps of:

obtaining connection information which is associated with network connection with the electronic device;

establishing wireless network connection with the electronic device according to the connection information thus obtained; and transmitting the first identifier and the first password, to the electronic device via the wireless network connection so as to enable the electronic device to connect to the wireless hp using the first identifier and the first password so that the electronic device gains access to the external network via the wireless AP.

According to a second aspect of the present invention, a computer program product includes a machine readable non-transitory storage medium having program instructions stored therein which when executed cause a portable communication device to perform a method of facilitating set up of network connection of an electronic device to an external network. The method is to be applied in a system that includes a wireless access point (AP) which has been connected to the external network, the electronic device, connection of which to the external network is desirable, and the portable communication device which is in possession of a first identifier and a first password associated with the wireless AP and which is wirelessly communicable with the wireless AP and the electronic device. The portable communication device is further in possession of connection information which is associated with network connection with the electronic device. The method includes the following steps of:

establishing wireless network connection with the electronic device according to the connection information; and transmitting the first identifier and the first password to the electronic device via the wireless network connection so as to enable the electronic device to connect to the wireless AP using the first identifier and the first password so that the electronic device gains access to the external network via the wireless AP.

According to a third aspect of the present invention, an electronic device is to connect to an external network. The electronic device is to be applied in a system that includes a wireless access point (AP) which has been connected to the external network, and a portable communication device which is in possession of a first identifier and a first password associated with the wireless AP and which is wirelessly communicable with the wireless AP and the electronic device. The electronic device includes a barcode, a wireless network module, a storage module and a processing module. The barcode is provided to be scanned by the portable communication device, and when decoded provides connection information which is associated with network connection with the electronic device. The wireless network module establishes wireless network connection with the portable communication device upon receiving the connection information transmitted by the portable communication device, and receives the first identifier and the first password transmitted by the portable communication device via the wireless network connection. The storage module stores the first identifier and the first password received by the wireless network module. The processing module configures the wireless network module to connect to the wireless AP using the first identifier and the first password so that the electronic device gains access to the external network via the wireless AP.

An effect of the present invention resides in that, by using a portable communication device to scan a barcode, and to establish wireless network connection with an electronic device, connection of which to an external network is desirable, so as to transmit the first identifier and the first password thereto via the wireless network connection, the electronic device is enabled to connect to the wireless AP using the first identifier and the first password so that the electronic device gains access to the external network via the wireless AP. Therefore, complicated input procedures may be omitted so as to save time. Moreover, the electronic device is not required to be provided with an input member, thereby further reducing cost. In this way, popularization of Internet of Things devices may be encouraged.

BRIEF DESCRIPTION OF THE DRAWINGS

Other features and advantages of the present invention will become apparent in the following detailed description of an embodiment with reference to the accompanying drawings, of which.

DETAILED DESCRIPTION OF THE EMBODIMENT

Figure 1:
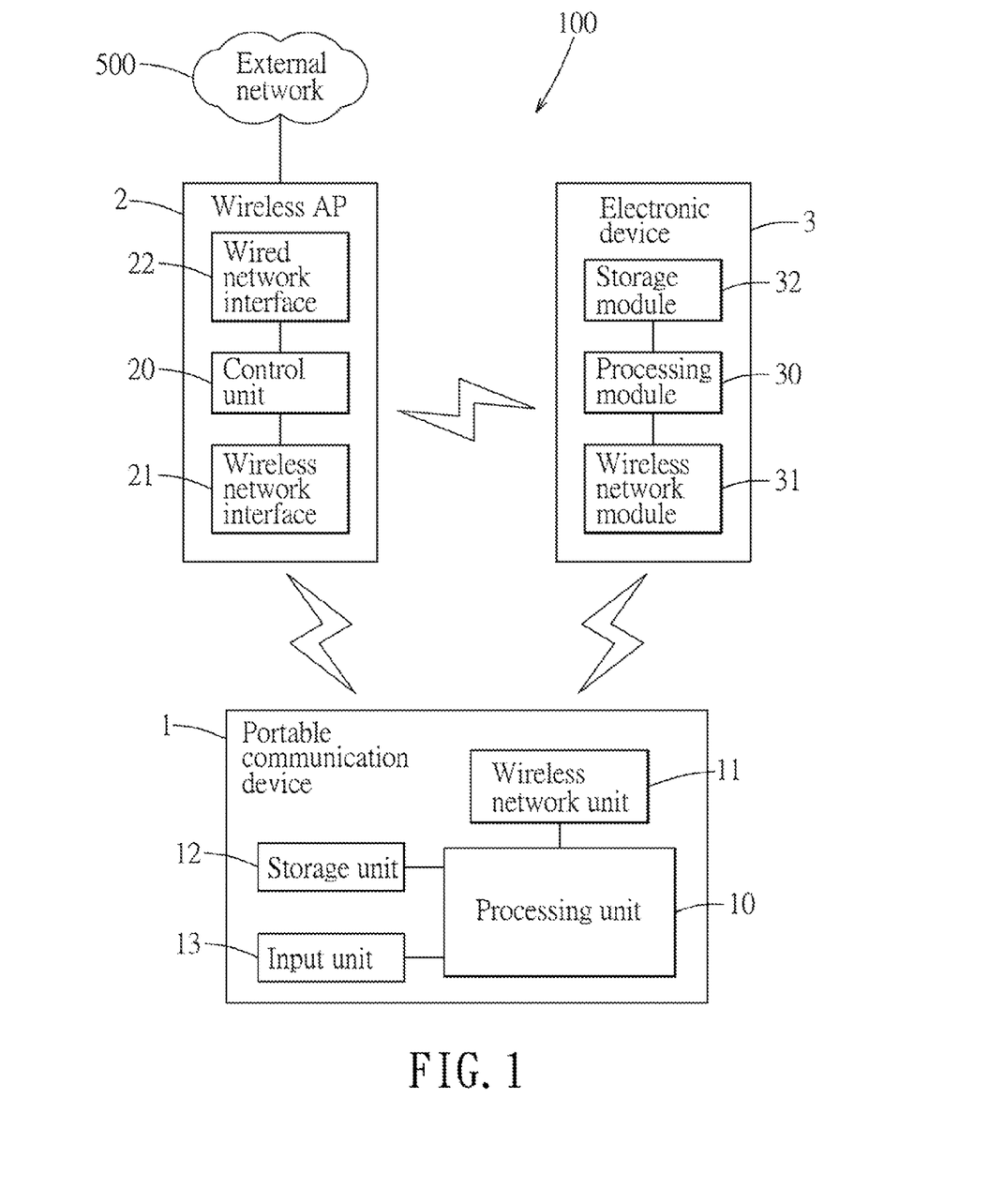
FIG. 1 is a block diagram illustrating a system in which a method of the present invention is applied.
Figure 3:
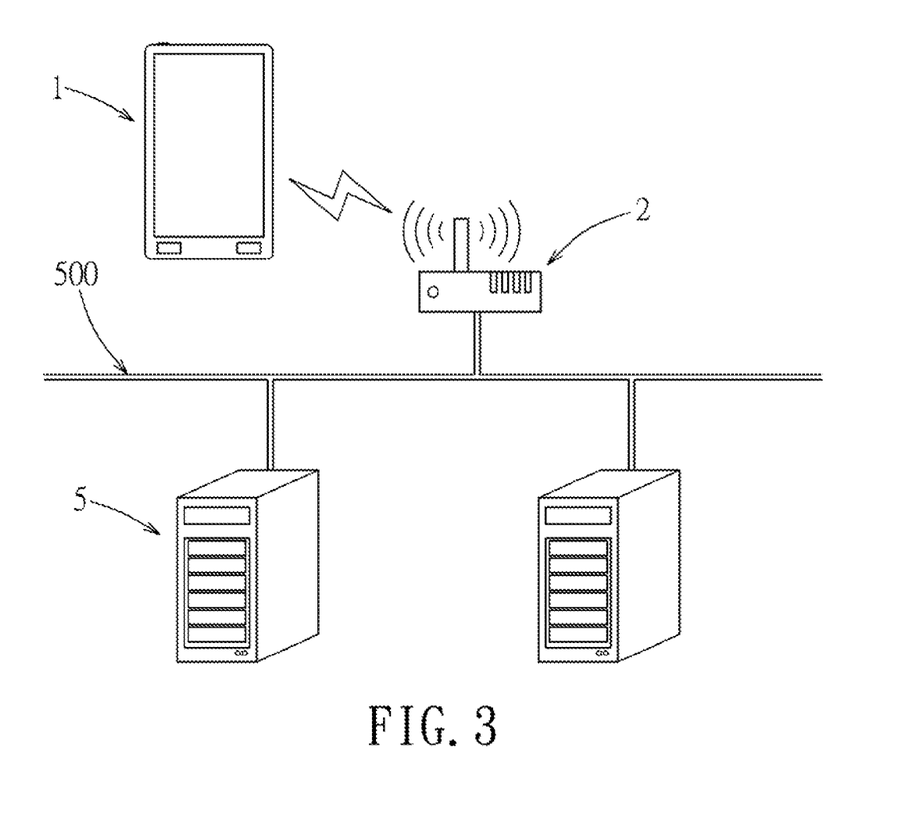
FIG. 3 is a schematic diagram illustrating that a wireless access point (AP) has been connected to the external network.

Referring to FIG. 1 and FIG. 3, an embodiment of a method of facilitating set up of network connection according to the present invention is to be applied in a wireless local area network (LAN) system 100. The wireless LAN system 100 includes a wireless access point (AP) 2 which has been connected to an external network 500 (e.g., the Internet), an electronic device 3, connection of which to the external network 500 is desirable, and a portable communication device 1 which is wirelessly communicable with both the wireless AP 2 and the electronic device 3.

The wireless AP 2 is but not limited to a wireless router, and includes a control unit 20, a wireless network interface 21 and a wired network interface 22. The wireless network interface 21 is a WiFi interface that conforms to 802.11 a/b/g wireless LAN communication protocols. The wired interface 22 is configured for wired connection with the external network 500. The control unit 20 is configured to receive wireless network signals from the wireless network interface 21, and to convert the wireless network signals into wired network signals which are to be transmitted via the wired network interface 22. On the other hand, the control unit 20 is further configured to receive wired network signals from the wired network interface 22, and to convert the wired network signals into wireless network signals which are to be transmitted via the wireless network interface 21. Furthermore, the external network 500 is connected to remote control platforms 5 (see FIG. 6) associated with the network layer and the application layer of the Internet of Things.

The portable communication device 1 is but not limited to a smart phone, which includes a processing unit 10, a wireless network unit 11, a storage unit 12 and an input unit 13. In this embodiment, the input unit 13 is an image capturing unit. The processing unit 10 of the portable communication device 1 receives via the wireless network unit 11 a first identifier, such as a first service set identifier (SSID) broadcasted by the wireless AP 2. In response to receipt of the first SSID, the portable communication device 1 prompts user input of a first password that corresponds to the first SSID. Afterwards, the processing unit 10 may store the first SSID and the first password in the storage unit 12, and is configured to transmit the first password to the wireless AP 2 via the wireless network unit 11 in an attempt to connect to the wireless AP 2. In this way, once the first password is correct, the portable communication device 1 is able to connect to the external network 500 (i.e., the Internet) via the wireless AP 2, so as to gain access to the Internet for data transfer over the Internet.

The input unit 13 of the portable communication device 1 is configured to read barcode data. The storage unit 12 is further installed with a barcode decoder program. The processing unit 10 loads and executes the barcode decoder program for decoding the barcode data to obtain contents corresponding to the barcode data.

Figure 4:
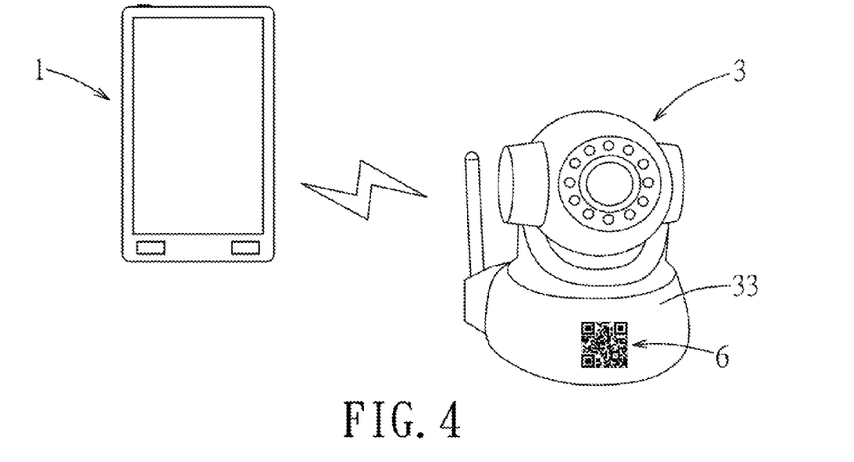
FIG. 4 is a schematic diagram illustrating a two-dimensional bar code to be scanned by a portable communication device.

The electronic device 3 includes a processing module 30, a wireless network module 31, a storage module 32, and a 20 barcode 6 (see FIG. 4).

Figure 2:
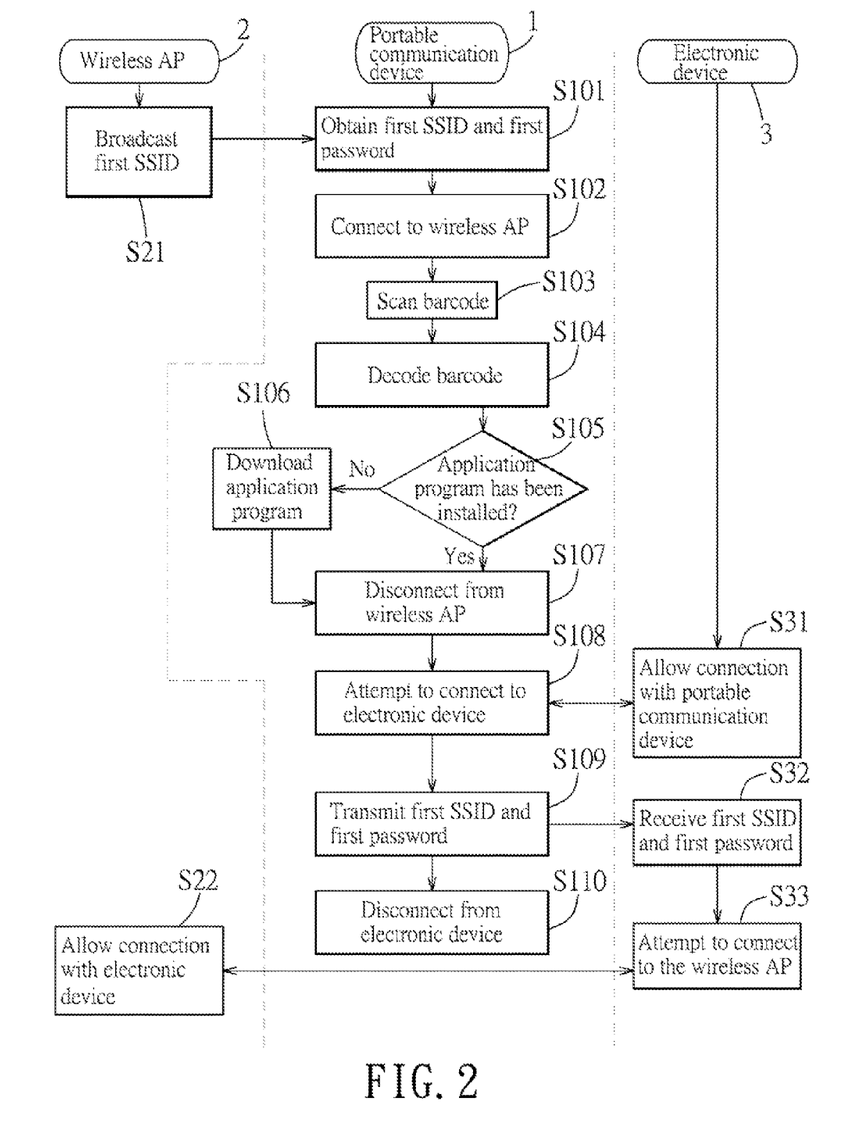
FIG. 2 is a flow chart illustrating an embodiment of the method of facilitating set up of network connection of an electronic device to an external network according to the present invention.

Referring to FIG. 1 and FIG. 2, the method of facilitating set up of network connection according to the present invention is to be implemented by the portable communication device 1 and includes the steps of S101 to S110.

In step S101, referring to FIG. 3, the portable communication device 1 obtains the first SSID broadcasted by the wireless AP 2, and obtains the first password corresponding to the first SSID by prompting user input of the first password in response to receipt of the first SSID. The first SSID and the first password are associated with a wireless LAN provided by the wireless AP 2. For instance, the portable communication device 1 obtains the first SSID from the wireless AP 2, which broadcasts the first SSID to the portable communication device 1 in step S21.

In step S102, the portable communication device 1 connects to the wireless AP 2 via the wireless LAN provided by the wireless AP 2 using the first SSID and the first password so that the portable communication device 1 gains access to the external network 500 via the wireless AP 2. In this way, the portable communication device 1 is able to connect to an external web address in step S106. Detailed description of connection to the web address will be explained later.

In step S103, referring to FIG. 4, the portable communication device 1 scans a two-dimensional (2D) barcode 6 using the input unit 13, i.e., the image capturing unit. The 2D barcode 6 is associated with the electronic device 3.

In step S104, the processing unit 10 of the portable communication device 1 decodes the 2D barcode 6 so as to obtain a web address for download of an application program, and connection information which is associated with network connection with the electronic device 3.

Figure 5:
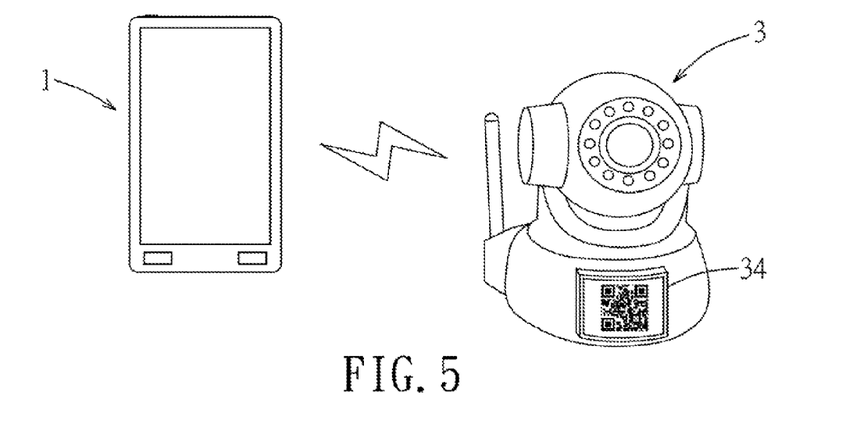
FIG. 5 is a schematic diagram illustrating that the portable communication device establishes wireless network connection with the electronic device.

Specifically, referring to FIG. 4 and FIG. 5, the 2D barcode 6 is provided in a way that the portable communication device 1, by decoding the 2D barcode 6, obtains a second identifier, such as a second SSID, and a second password which together serve as the connection information. The electronic device 3 further includes a housing 33 and the 2D barcode 6 is directly printed on the housing 33. Alternatively, the electronic device 3 may further include a display 34, and the 2D barcode 6 is presented by the display 34 of the electronic device 3.

It is noted that, in other embodiments, the application program may be provided in the form of a computer program product that stores the application program. After the application program has been loaded and executed by the portable communication device 1, at least the steps of S108 to S110 of the method of facilitating set up of network connection are to be performed.

In step S105, the processing unit 10 of the portable communication device 1 determines whether the application program has been installed in the portable communication device 1.

In step S106, when it is determined that the application program has not yet been installed in the portable communication device 1, the processing unit 10 configures the portable communication device 1 to connect to the web address so as to download the application program from the web address.

In step S107, when it is determined that the application program has been installed in the portable communication device 1, the processing unit 10 controls the wireless network unit 11 to be disconnected from the wireless AP 2, and thus disconnected from the external network 500.

In step S108, further referring to FIG. 5, the portable communication device 1 attempts to establish a wireless network connection, i.e., wireless LAN connection of an internal network, with the electronic device 3 using the second SSID and the second password. The wireless network connection is established when the electronic device 3 receives, via the wireless network module 31, the second SSID and the second password from the portable communication device 1 (see step S31 performed by the electronic device 3).

Specifically, the wireless network connection is realized by a wireless ad hoc net work. However, in other embodiments, the wireless network connection can be realized by other protocols, such as ZigBee, Bluetooth, UWB, NFC, etc., and systems having similar technical features and development trends with those of the WiFi system, which also belongs to the wireless LAN technology, may also be adopted to realize the wireless network connection in the present invention. It is noted that the WiFi wireless LAN has advantages that, additional buttons or network transmission interfaces are not required. As long as there is the wireless transmission module 31 (see FIG. 1) which has internal/external network transmission functionalities installed in the electronic device 3, the method of facilitating set up of network connection of the present invention can be implemented. It is noted that since the electronic device 3 is not required to be provided with any button and wired connection port, a miniaturization design may be achieved.

In step S109, the portable communication device 1 transmits the first SSID and the first password, which correspond to the wireless LAN provided by the wireless AP 2, to the wireless network module 31 of the electronic device 3 via the wireless network connection for storage by the storage module 32 of the electronic device 3. With the first SSID and the first password acquired, the processing module 30 may then configure the wireless network module 31 to connect to the wireless AP 2 using the first SSID and the first password so that the electronic device 3 gains access to the external network 500 via the wireless AP 2.

In step S110, the portable communication device 1 is disconnected from the electronic device 3.

It is noted that in the condition that the 2D barcode 6 is presented by the display 34, when the second identifier and the second password are reset anew by the portable communication device 1 when the electronic device 3 is wirelessly connected to the portable communication device 1, the display 34 of the electronic device 3 presents a new barcode corresponding to the second identifier and the second password, thus reset anew.

The following description relates to the steps performed by the electronic device 3 and the wireless AP 2 in association with the method.

In step S32, the electronic device 3, in response to step S109, receives and stores the first SSID and the first password transmitted by the portable communication device 1 via the wireless network connection.

Figure 6:
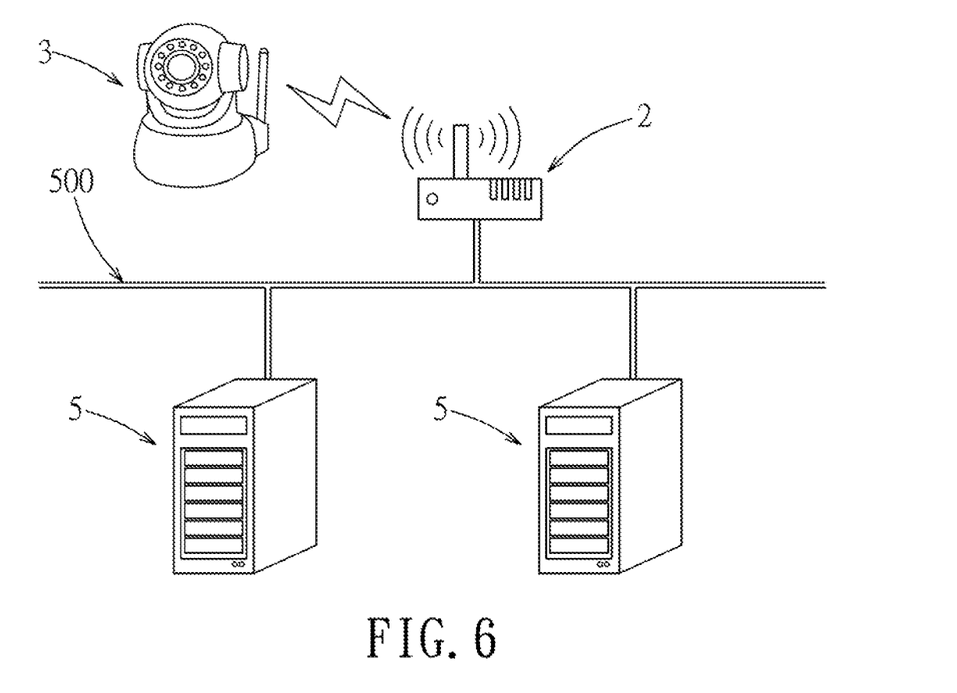
FIG. 6 is a schematic diagram illustrating that the electronic device connects to the wireless AP and gains access to the external network.

In step S33, referring further to FIG. 6, the electronic device 3 attempts to connect to the wireless AP 2 using the first SSID and the first password for login so as to gain access to the external network 500 via the wireless AP 2.

Subsequent to step S33, in step S22, once the wireless AP 2 receives the first SSID and the first password from the electronic device 3, the electronic device 3 is successfully connected to the wireless AP 2 so that the electronic device 3 gains access to the external network 500 via the wireless AP 2.

Furthermore, after the electronic device 3 has been connected to the wireless AP 2, the portable communication device 1 is able to remotely control the electronic device 3 by accessing the external network 500 in other mode, such as WiFi, 3G, 4G, etc., without connecting to the wireless AP 2. In this way, applications associated with remote control of the electronic device 3 on the Internet of Things by the portable communication device 1 may be achieved.

To sum up, an effect of the present invention resides in that, by using the portable communication device 1 to scan the 2D barcode 6 that is associated with the electronic device 3, connection of which to the external network 500 is desirable, and to establish a wireless network connection with the electronic device 3 so as to transmit the first SSID and the first password thereto via the wireless network connection, the electronic device 3 is enabled to connect to the wireless AP 2 using the first SSID and the first password so as to gain access to the external network 500 via the wireless AP 2. Therefore, complicated input procedures stay be omitted so as to save time. Moreover, the electronic device 3 is not required to be provided with an input member, which further reduces cost. In this way, popularization of Internet of Things devices may be encouraged.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of facilitating set up of network connection of an electronic device to an external network, the method to be applied in a system that includes a wireless access point (AP) which has been connected to the external network, the electronic device, connection of which to the external network is desirable, including a display, and a portable communication device which is in possession of a first identifier and a first password associated with the wireless AP and which is wirelessly communicable with the wireless AP and the electronic device, the method to be implemented by the portable communication device, the method comprising:

connecting to the wireless AP via a wireless local area network (LAN) provided by the wireless AP using the first identifier and the first password so as to gain access to the external network;

obtaining connection information which is associated with network connection with the electronic device;

establishing wireless network connection with the electronic device according to the connection information as obtained; and transmitting the first identifier and the first password to the electronic device via the wireless network connection so as to enable the electronic device to connect to the wireless AP using the first identifier and the first password so that the electronic device gains access to the external network via the wireless AP, wherein the obtaining the connection information includes:

scanning a barcode associated with the electronic device and presented by the display;

decoding the barcode to obtain a web address for download of an application program and to obtain a second identifier and a second password which serve as the connection information, the second identifier being a service set identifier (SSID), connecting to the web address, through the wireless AP and the external network, to download the application program which when executed causes the portable communication device to perform disconnecting from the wireless AP so as to disconnect from the external network, the establishing the wireless network connection with the electronic device, the transmitting the first identifier and the first password to the electronic device, and resetting anew the second identifier and the second password as the electronic device is wirelessly connected to the portable communication device so that the display presents a new barcode corresponding to the second identifier and the second password thus reset anew.

2. The method according to claim 1, further comprising:

after the electronic device is enabled to connect to the wireless AP, performing remote control of the electronic device by accessing the external network without connecting to the wireless AP.

3. An electronic device to connect to an external network, the electronic device to be applied in a system that includes a wireless access point (AP) which has been connected to the external network, and a portable communication device which is in possession of a first identifier and a first password associated with the wireless AP and which is wirelessly communicable with the wireless AP and the electronic device, connecting to the wireless AP via a wireless local area network (LAN) provided by the wireless AP using the first identifier and the first password to gain access to the external network, the electronic device comprising:

a barcode provided to be scanned by the portable communication device, and when decoded providing a web address for download of an application program, and connection information which is associated with network connection with the electronic device and that includes a second identifier and a second password, the second identifier being a service set identifier (SSID), the portable communication device connecting to the web address through the wireless AP and the external network to download the application program, when the application program is executed, the application program causes the portable communication device to disconnect from the wireless AP to disconnect from the external network, to attempt to establish wireless network connection with the electronic device, and to transmit the first identifier and the first password thereto;

a wireless network module that receives the connection information transmitted by the portable communication device for allowing the wireless network connection with the portable communication device, and that receives the first identifier and the first password transmitted by the portable communication device via the wireless network connection;

a storage module including a storage medium that stores the first identifier and the first password transmitted by the portable communication device;

a processing module including a microprocessor that is connected to the wireless network module and the storage module, that retrieves the first identifier and the first password stored in the storage module, and that configures the wireless network module to connect to the wireless AP using the first identifier and the first password so that the electronic device gains access to the external network via the wireless AP; and a display for presenting the barcode, wherein, when the second identifier and the second password are reset anew by the portable communication device when the electronic device is wirelessly connected to the portable communication device, the display presents a new barcode corresponding to the second identifier and the second password thus reset anew.

4. The electronic device according to claim 3, wherein after the electronic device has been connected to the wireless AP, the electronic device is to be remotely controlled by the portable communication device by accessing the external network without connecting to the wireless AP.

5. The electronic device according to claim 3, wherein the electronic device is an electronic device to be applied on the Internet of Things.

* * * * *